(12) United States Patent
Chae et al.

(10) Patent No.: US 8,451,297 B2
(45) Date of Patent: May 28, 2013

(54) IDENTIFYING A RECTANGULAR AREA IN A MULTI-PROJECTOR SYSTEM

(75) Inventors: Sangwon Chae, Irvine, CA (US); Hung Khei Huang, Irvine, CA (US); Yasuhiro Komori, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 12/965,266

(22) Filed: Dec. 10, 2010

(65) Prior Publication Data

US 2012/0147054 A1 Jun. 14, 2012

(51) Int. Cl.
*G09G 5/00* (2006.01)

(52) U.S. Cl.
USPC ............................ 345/668; 345/441; 348/745

(58) Field of Classification Search
USPC ............................ 345/441, 668; 348/744, 745
See application file for complete search history.

(56) References Cited

U.S. PATENT DOCUMENTS

| | | | |
|---|---|---|---|
| 6,729,733 B1 | 5/2004 | Raskar et al. | |
| 7,215,362 B2 | 5/2007 | Klose | |
| 2005/0276477 A1* | 12/2005 | Lin et al. ...................... | 382/173 |
| 2009/0115915 A1 | 5/2009 | Steinberg et al. | |

OTHER PUBLICATIONS

Knauer et al., "Largest Inscribed Rectangles in Convex Polygons (Extended Abstract)", EuroCG 2010, Dortmund, Germany, Mar. 22-24, 2010.

* cited by examiner

*Primary Examiner* — M Good Johnson
(74) *Attorney, Agent, or Firm* — Fitzpatrick, Cella, Harper & Scinto

(57) ABSTRACT

Determining a rectangular area with a given aspect ratio within a global boundary formed by multiple projectors. An iterated process is repeated at moved locations along the global boundary, until a stopping condition is met. According to the iterated process, a point at a location of the global boundary is selected, a minimum rectangle with the given aspect ratio is grown from identified directions, and the largest rectangle encountered is delivered when the stopping condition has been met. For each such direction, the minimum rectangle is grown in the direction from the selected point until it intersects with a boundary, the grown rectangle is grown in another direction responsive to a determination that the grown rectangle can grow in another direction. The largest rectangle encountered previously is replaced, responsive to a comparison which indicates that the grown rectangle is larger than the largest rectangle encountered previously.

24 Claims, 10 Drawing Sheets

IDENTIFYING A RECTANGULAR AREA IN A MULTI-PROJECTOR SYSTEM

FIELD

The present disclosure relates to identification of a rectangular area within a composite projection area formed on a projection surface by a projector array of multiple projectors.

BACKGROUND

A multi-projector system typically involves an array of projectors that each projects onto a projection surface to form a composite projection area on the projection surface. The boundary of the composite projection area is mainly circumscribed by a polygon that is formed by outermost edges of the overlapped projection patterns formed by the multiple projectors. Typically, a large rectangular projection area is identified within this global boundary, and images are projected within the large rectangular projection area.

SUMMARY

The inventors herein have observed that a typical boundary of the composite projection area in a multi-projector system is circumscribed by both convex and concave polygons. Techniques exist for identifying a largest inscribed rectangle in a convex polygon. However, such techniques are limited to convex polygons. Thus, such techniques cannot ordinarily be used to identify a largest inscribed rectangle in a composite projection area circumscribed by a polygon that is concave.

The foregoing situation is addressed herein by iteratively growing a minimum rectangle with a given aspect ratio from moved locations on a global boundary until a stopping condition is met, and delivering the largest rectangle.

Thus, in an example embodiment described herein, a rectangular area with a given aspect ratio is determined within a global boundary formed on a projection surface by multiple projectors. An iterated process is repeatedly performed at moved locations along the global boundary until a stopping condition has been met. According to the iterated process, a point at a location of the global boundary is selected, directions aligned with a minimum rectangle positioned at the selected point are identified in which the minimum rectangle with the given aspect ratio can be grown from the selected point, the minimum rectangle is grown from each determined direction, and the largest rectangle encountered is delivered responsive to a determination that the stopping condition has been met. More specifically, for each determined direction, the minimum rectangle with the given aspect ratio is grown in the direction from the selected point until it intersects with a boundary of the global boundary, a determination is made as to whether the grown rectangle can grow in another direction responsive to the grown rectangle intersecting with the boundary of the global boundary, and the grown rectangle is grown in the other direction responsive to a determination that the grown rectangle can grow in the other direction. The largest rectangle encountered previously is replaced, responsive to a comparison which indicates that the grown rectangle is larger than the largest rectangle encountered previously.

By virtue of this arrangement, it is ordinarily possible to utilize a composite projection area more efficiently, because a larger rectangular area within which to project images may be identified within the global boundary of the projection area.

In another example embodiment described herein, the global boundary comprises a polygonal boundary formed by distorted projections of rectangles by all of the multiple projectors in a projector array onto the projection surface.

In another example embodiment described herein, the global boundary comprises a concave polygon.

By virtue of this arrangement, it is ordinarily possible to utilize a concave composite projection area more efficiently, because a larger rectangular area within which to project images may be identified within the global boundary of the concave projection area.

In another example embodiment described herein, the moved locations along the global boundary are locations moved by a predetermined interval.

In another example embodiment described herein, the minimum rectangle grows by a predetermined interval.

In another example embodiment described herein, the stopping condition comprises a determination that the entirety of the global boundary has been traversed.

This brief summary has been provided so that the nature of this disclosure may be understood quickly. A more complete understanding can be obtained by reference to the following detailed description and to the attached drawings.

DETAILED DESCRIPTION

Figure 1:
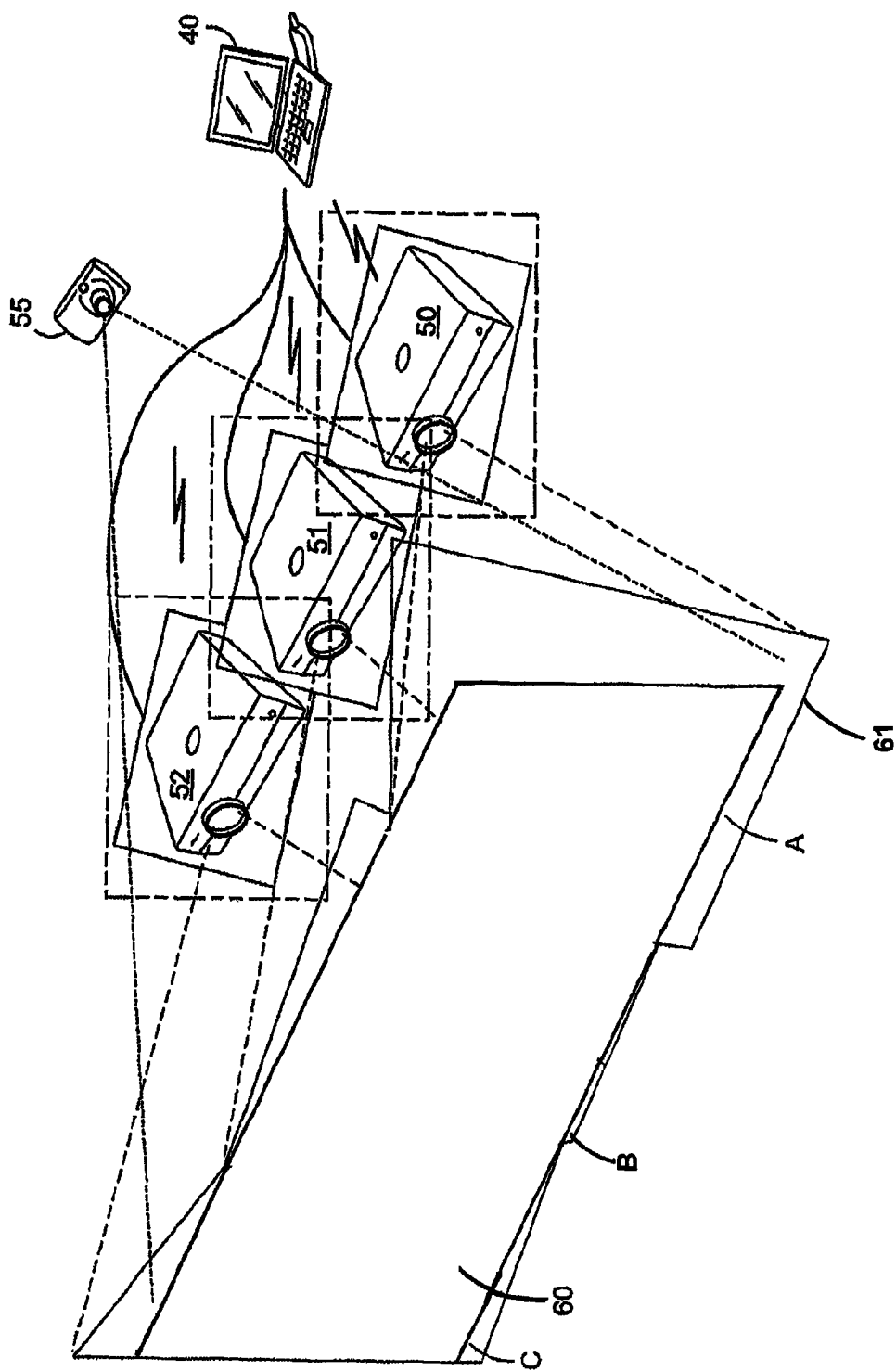
FIG. 1 is representative view of a multiprojector system relevant to one example embodiment.

FIG. 1 is representative view of a multiprojector system including a projector array, a host computer and camera, relevant to one example embodiment. Host computer 40 generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Host computer 40 includes a color monitor including a display screen, a keyboard for entering text data and user commands, and a pointing device. The pointing device can be, for example, a mouse for pointing and for manipulating objects displayed on the display screen.

Host computer 40 also includes one or more non-transitory computer-readable storage medium which is constructed to retrievably store computer-readable information such as computer-executable process steps. The non-transitory computer-readable storage medium on which a computer-executable program or process steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

Host computer 40 may acquire image data from other sources such as a digital camera, a local area network or the Internet via a network interface. Likewise, host computer 40 may interface with color output devices other than projectors 50 to 52, such as color output devices accessible over the network interface.

Host computer 40 acquires image data for an input image, and provides image data to each of projectors 50 to 52 such that a corresponding image is displayed on a projection surface. In addition, the image data is provided for display by projectors 50 to 52 such that the image is substantially aligned with the projection screen.

In this example, projectors 50 to 52 are RGB or RGBW projectors, such as DLP™ digital projectors or other display devices that project images in accordance with image data from the host computer 40 onto a projection surface. Projectors 50 to 52 may be HDR devices capable of projecting HDR images, and may further include, for example, LCD projectors, LCOS projectors, LED projectors, and the like.

Together, projectors 50 to 52 make up a projector array, and in accordance with image data received from host computer 40, projectors 50 to 52 project the image onto a projection screen by using additive light combinations of red (R), green (G) and blue (B) colorant lights. In addition, and particularly in a case of an HDR device, projectors 50 to 52 also use a white (W) light so as to increase the brightness/luminance of projected images and thereby project HDR images with good fidelity over a large dynamic range.

Digital color camera 55 is an example of a color input device, and is provided for sending digital image data to host computer 40. In particular, digital color camera 55 captures images of the projection surface of the projector array in order to facilitate control of the multiprojector system.

FIG. 1 shows an example wherein projectors 50 to 52 are positioned to form one composite projection area. As shown in FIG. 1, projector 50 displays individual projection area A, projector 51 displays individual projection area B and projector 52 displays individual projection area C. In other words, individual projection areas A, B and C are respectively displayed when projectors 50 to 52 independently display white light. In this case, individual projection areas A, B and C together comprise the composite projection area, and image data is provided by host computer 40 such that each of projectors 50 to 52 displays the appropriate portion of an image on the composite projection area on the projection surface. As shown in FIG. 1, the composite projection area is circumscribed by a boundary 61 that has a shape of a concave polygon, and the image is displayed on the projection surface in rectangular area 60 within the boundary 61.

In the example embodiment, the rectangular area 60 has an aspect ratio that matches the aspect ratio of the image. However, in other embodiments, the rectangular area is not constrained by the aspect ratio of the image.

Figure 2:
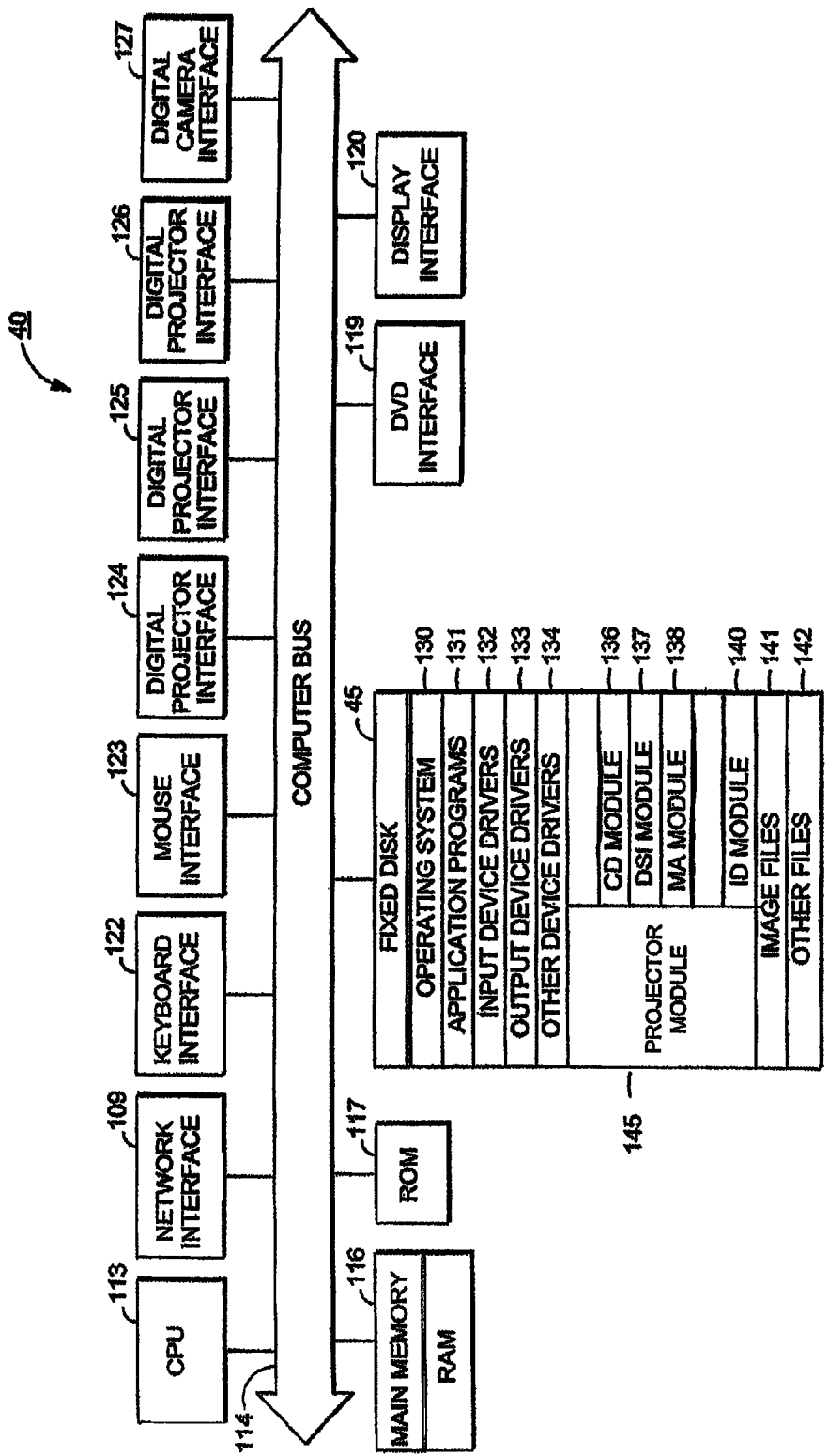
FIG. 2 is a detailed block diagram showing the internal architecture a host computer.

FIG. 2 is a detailed block diagram showing the internal architecture of host computer 40. As shown in FIG. 2, host computer 40 includes central processing unit (CPU) 113 which may be a single-core or a multi-core CPU and which interfaces with computer bus 114.

Also interfacing with computer bus 114 are fixed disk 45, network interface 109, random access memory (RAM) 116 for use as a main run-time transient memory, read only memory (ROM) 117, DVD disk interface 119, display interface 120 for a monitor, keyboard interface 122 for a keyboard, mouse interface 123 for a pointing device, digital projector interface 124 for projector 50, digital projector interface 125 for projector 51, digital projector interface 126 for projector 52, and digital camera interface 127 for digital camera 55.

RAM 116 interfaces with computer bus 114 so as to provide information stored in RAM 116 to CPU 113 during execution of the instructions in software programs such as an operating system, application programs, control modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, fixed disk 45 contains computer-executable process steps for operating system 130, and application programs 131, such as graphic image management programs. Fixed disk 45 also contains computer-executable process steps for device drivers for software interface to devices, such as input device drivers 132, output device drivers 133, and other device drivers 134. Image files 141, including color image files, and other files 142 are available for output to color output devices and for manipulation by application programs.

Projector module 145 comprises computer-executable process steps executed by a computer for control of a multi-projector system, where the multiprojector system includes multiple projectors arranged in a projector array. Projector module 145 determines a rectangular area with a given aspect ratio within a global boundary formed on a projection surface by multiple projectors. Projector module 145 repeatedly performs an iterated process at moved locations along the global boundary until a stopping condition has been met.

The following is a description of the iterated process performed by projector module 145. A point at a location of the global boundary is selected, and directions aligned with a minimum rectangle positioned at the selected point are identified. The identified directions are directions in which the minimum rectangle can be grown from the selected point while still maintaining a given aspect ratio. The minimum rectangle is grown from each determined direction, and the largest rectangle encountered is delivered responsive to a determination that the stopping condition has been met.

In more detail, for each determined direction, the minimum rectangle with the given aspect ratio is grown in the direction from the selected point until it intersects with a boundary of the global boundary. A determination is made as to whether the grown rectangle can grow in another direction responsive to the grown rectangle intersecting with the boundary of the global boundary. Responsive to a determination that the grown rectangle can grow in the other direction, the grown rectangle is grown in the other direction. The largest rectangle encountered previously is replaced, responsive to a comparison which indicates that the grown rectangle is larger than the largest rectangle encountered previously.

As shown in FIG. 2, projector module 145 includes, at least, computer-executable process steps for plural modules of this embodiment, including corner detection (CD) module 136, divide source image (DSI) module 137, maximum area (MA) module 138, and image display (ID) module 140.

CD module 136 is constructed to detect corners of each individual projection area projected by each of projectors 50 to 52 in order to determine which projector in the projector array is responsible for projecting a particular individual projection area. The corners of the individual projection area are detected by causing digital camera 55 to capture an image of each individual projection area projected by each of the projectors in the projector array, and analyzing the captured image.

DSI module 137 is constructed to divide an input image to be projected by projectors 50 to 52 into sub-images based on the individual projection area projected by each of the projectors in the projector array. In some cases, DSI module 137 divides the input image into sub-images based on an aspect ratio of the input image.

MA module 138 is constructed to calculate a rectangular area for the composite projection area. In many cases, the rectangular area calculated by MA module 138 is a maximum rectangular area that is circumscribed by a global boundary of the composite projection area. In the example embodiment, the aspect ratio of the input image is used to determine the rectangular area, and in many cases, the rectangular area calculated by MA module 138 is a maximum rectangular area that has the aspect ratio of the input image and that is circumscribed by a global boundary of the composite projection area.

ID module 140 is constructed to display an image corresponding to the input image on the projection surface in rectangular area 60 within the boundary 61. ID module 140 provides image data to each of the projectors 50 to 52 for display based on the determined locations for rectangular areas provided by MA module 138.

The computer-executable process steps for projector module 145 may be configured as a part of operating system 130, as part of an output device driver such as a projector driver, or as a stand-alone application program such as a multiprojector management system. They may also be configured as a plug-in or dynamic link library (DLL) to the operating system, device driver or application program. For example, projector module 145 according to example embodiments may be incorporated in an output device driver for execution in a computing device, such as a projector driver, embedded in the firmware of an output device, such as a projector, or provided in a stand-alone application for use on a general purpose computer. In one example embodiment described herein, projector module 145 is incorporated directly into the operating system for general purpose host computer 40. It can be appreciated that the present disclosure is not limited to these embodiments and that the disclosed control module may be used in other environments in which control of a multiprojector system is desired.

Figure 3:
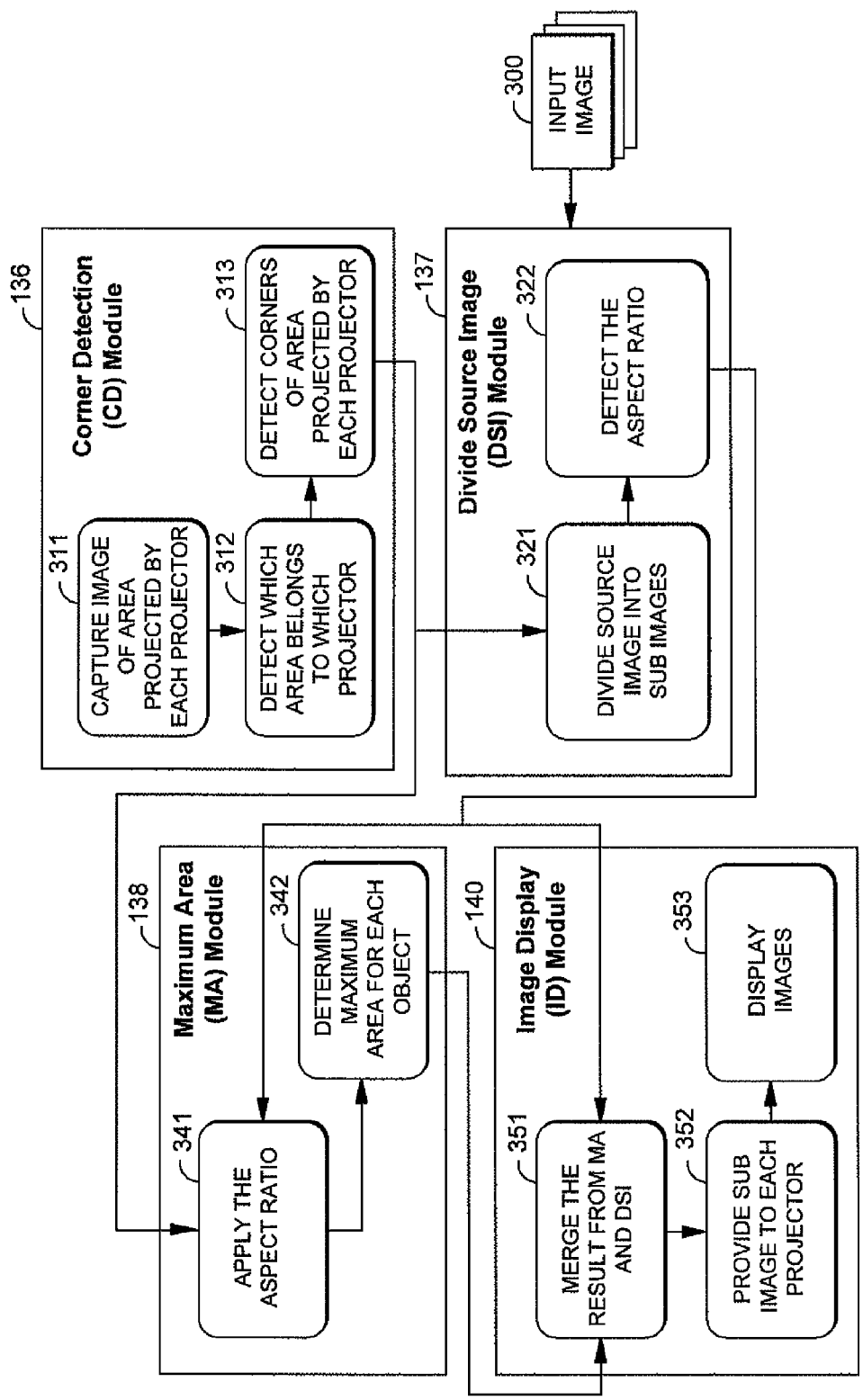
FIG. 3 is a view for explaining software architecture of a projector module for a multiprojector system according to an example embodiment.

FIG. 3 is a view for explaining software architecture of projector module 145 for a multiprojector system according to an example embodiment.

As shown in FIG. 3, CD module 136 outputs coordinates for each of the corners of each of the individual projection areas displayed by projectors 50 to 52. In the example embodiment, the coordinates are based on a virtual coordinate system of the projection surface. CD module 136 comprises computer-executable process steps to detect a corner of each individual projection area projected by each of projectors 50 to 52 (313) in order to determine which projector in the projector array is responsible for projecting a particular individual projection area (312). The corner of the individual projection area is detected by causing digital camera 55 to capture an image of each individual projection area projected by each of the projectors in the projector array (311), and analyzing the captured image. More specifically, one projector at a time is controlled to display white light, and digital camera 55 captures an image of the individual projection area displayed by the one projector.

In this embodiment, the corners of each of the individual projection areas on the projection surface are detected by analyzing the captured image using, for example, a Canny algorithm to determine the coordinates of each of the corners of the individual projection areas.

DSI module 137 accepts, as input, the coordinates of the corners of each individual projection area from CD module 136 and input image 300. In the example embodiment, based on these inputs, DSI module 137 outputs the aspect ratio of the input image 300, and individual aspect ratios for each sub-image together with the image data for each sub-image. More specifically, DSI module 137 comprises computer-executable process steps to divide input image 300 into sub-images to be projected by each of projectors 50 to 52, based on the individual projection area projected by each of the projectors in the projector array (321). In the example embodiment, DSI module 137 divides input image 300 into sub-images based on aspect ratio information of the input image, including, for example, the individual aspect ratios for each sub-image (322).

In other embodiments, DSI module 137 divides input image 300 based purely on the contents of input image 300, or purely on the characteristics of the multiprojector system, or a combination of both.

In the example embodiment, MA module 138 accepts, as input, the coordinates of the corners of each individual projection area, and the individual aspect ratios of each of the sub-images from DSI module 137. MA module 138 determines the global boundary 61 based on the coordinates of the corners of each individual projection area. Based on the determined global boundary 61 and the aspect ratios of each of the sub-images, MA module 138 outputs coordinates indicating a rectangular area on which an image can be displayed within the global boundary 61. More specifically, MA module 138 comprises computer-executable process steps to calculate a rectangular area that is circumscribed by the global boundary 61 of the composite projection area, taking into account the individual aspect ratios (341), such that the image is displayed in the rectangular area in accordance with the aspect ratio of the input image 300. In other embodiments, the rectangular area is calculated without taking into account the individual aspect ratios (341).

In particular, in this embodiment, MA module 138 calculates the rectangular area by performing an iterated process at moved locations along the global boundary 61 until a stopping condition has been met. The following is a description of the iterated process performed by MA module 138. At the beginning of each iteration, a point at a location of the global boundary 61 is selected. A determination is made as to whether the point can be grown into a minimum rectangle having the aspect ratio of the input image 300, and if so, the point is grown into a minimum rectangle having the aspect ratio of the input image 300. For example, if the input image 300 has a 1:1 aspect ratio, then the corresponding minimum rectangle has a width of two pixels and a height of two pixels, i.e., the minimum rectangle is a four pixel square. If the point cannot be grown into a minimum rectangle having the aspect ratio of the input image 300, then the iteration ends.

Directions aligned with the minimum are identified. The identified directions are directions in which the minimum rectangle can be grown from the selected point while still maintaining the aspect ratio of the input image 300. In the example embodiment, the directions are aligned with the diagonals the minimum rectangle, and the identified directions are diagonal directions in which the minimum rectangle can be grown from the selected point while still maintaining the aspect ratio of the input image 300. The minimum rectangle is grown from each determined direction.

In more detail, for each determined direction, the minimum rectangle is grown in the direction from the selected point until it intersects with a boundary of the global boundary 61. Responsive to the grown rectangle intersecting with the boundary of the global boundary, a determination is made as to whether the grown rectangle can grow in another direction. Responsive to a determination that the grown rectangle can grow in the other direction, the grown rectangle is grown in the other direction. The largest rectangle encountered previously is replaced, responsive to a comparison which indicates that the grown rectangle is larger than the largest rectangle encountered previously.

Responsive to a determination that the stopping condition has been met, the largest rectangle encountered is delivered as the rectangular area 60 on which the image can be displayed within the global boundary 61.

ID module 140 accepts, as input, the coordinates indicating the location of the largest rectangular area calculated by MA module 138, and also receives as input the sub-images from DSI module 137. Based on these inputs, ID module 140 outputs sub-images to each of projectors 50 to 52 in the projector array, such that each projector displays the appropriate portion of the image on the largest rectangular area within the composite projection area on the projection screen, and such that the image is substantially aligned with the projection screen.

More specifically, ID module 140 comprises computer-executable process steps to cause projectors 50 to 52 to form an image corresponding to the input image 300 (353). ID module 140 provides image data to each of the projectors 50 to 52 for display (352) based on the location for the largest rectangular area calculated by MA module 138 (351). In particular, ID module 140 scales and shifts each sub-image to adjust the sub-images for display on the largest rectangular area.

Figure 4:
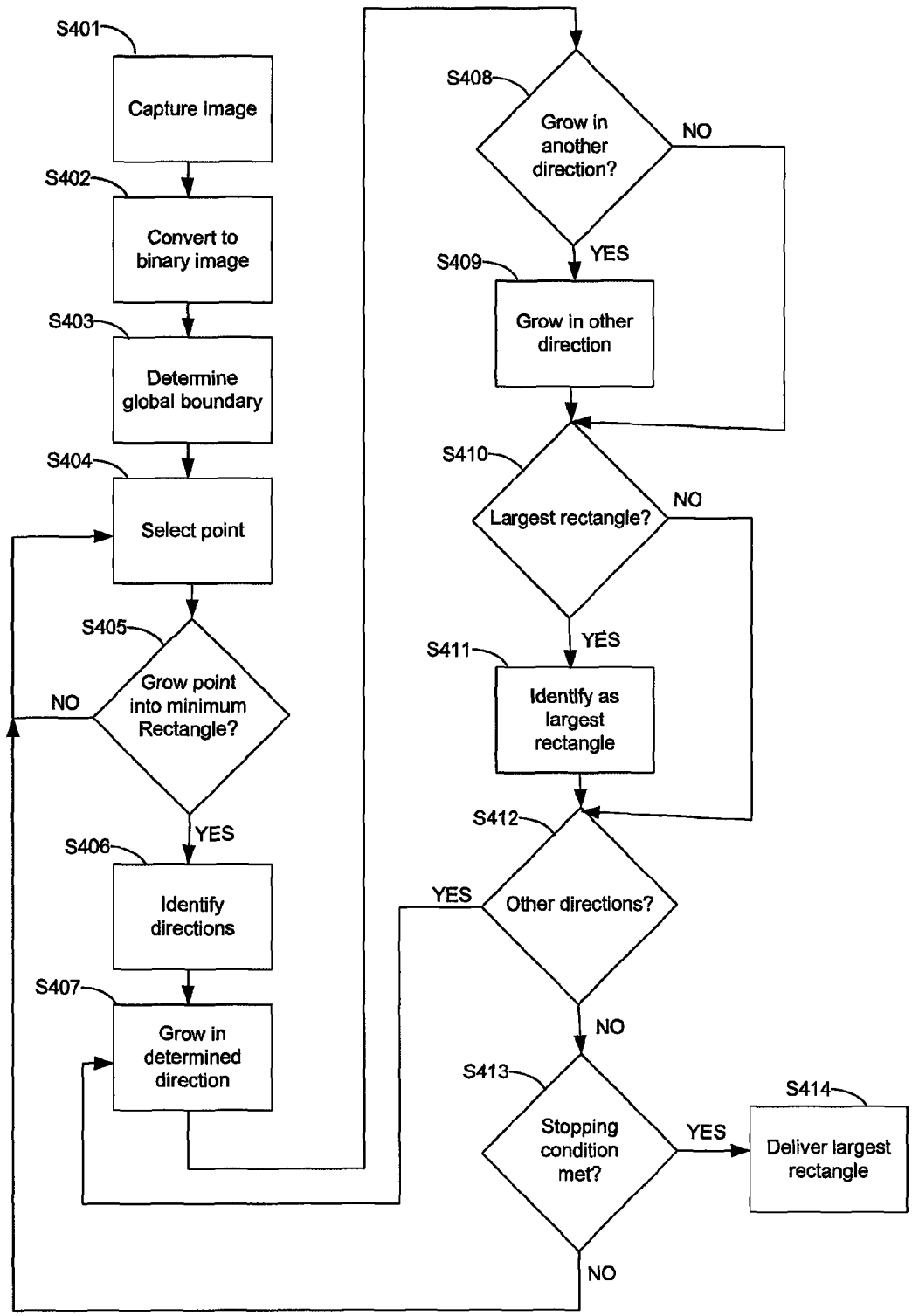
FIG. 4 is a flow diagram for explaining determination of a rectangular area within the global boundary according to an example embodiment.

FIG. 4 is a flow diagram for explaining determination of a rectangular area with a given aspect ratio within the global boundary according to the example embodiment. The process steps shown in FIG. 4 are computer-executable process steps stored on a computer-readable memory medium such as at 145 on fixed disk 45, and are executed by CPU 113 of host computer 40, so as to implement a projector module for control of a multiprojector system including multiple projectors arranged in a projector array. Briefly, according to the process steps shown in FIG. 4, an iterated process is repeated at moved locations along the global boundary, until a stopping condition is met. According to the iterated process, a point at a location of the global boundary is selected, a minimum rectangle with the given aspect ratio is grown from identified directions, and the largest rectangle encountered is delivered when the stopping condition has been met. For each such direction, the minimum rectangle is grown in the direction from the selected point until it intersects with a boundary, the grown rectangle is grown in another direction responsive to a determination that the grown rectangle can grow in another direction. The largest rectangle encountered previously is replaced, responsive to a comparison which indicates that the grown rectangle is larger than the largest rectangle encountered previously. Responsive to a determination that a stopping condition has been met, the largest encountered rectangle is delivered.

In more detail, in step S401, CD module 136 causes digital camera 55 to capture an image of each individual projection area projected by each of the projectors in the projector array.

In the example embodiment, CD module 136 converts the captured image into a binary image (step S402) to improve detection of corners. However, in other embodiments, corners can be detected from the captured image without converting the captured image into a binary image.

In step S403, CD module 136 analyzes the captured image to determine coordinates for corners of each individual projection area. In the example embodiment, the coordinates are based on a virtual coordinate system of the projection surface. In this embodiment, the corners of each of the individual projection areas on the projection surface are detected by analyzing the captured image using, for example, a Canny algorithm. DSI module 137 accepts, as input, the coordinates of the corners of each individual projection area from CD module 136. DSI module 137 also accepts, as input, the input image 300. In the example embodiment, based on these inputs, DSI module 137 divides input image 300 into sub-images based on aspect ratio information of the input image, including, for example, the individual aspect ratios for each sub-image. MA module 138 accepts, as input, the coordinates of the corners of each individual projection area from CD module 136, and determines the global boundary 61 based on the coordinates of the corners of each individual projection area.

In step S404, MA module 138 selects a point at a location of the global boundary 61 determined in step S403. MA module 138 determines whether the point can be grown into a minimum rectangle having the aspect ratio of the input image 300 (step S405). If the point cannot be grown into a minimum rectangle having the aspect ratio of the input image 300 ("NO" in step S405), then processing returns to step S404 where a new point is selected at a location of the global boundary. In the example embodiment, the new point is selected such that its location differs from the location of the previously selected point by a predetermined interval. The predetermined interval can be selected based on a user input. A longer interval may be selected to increase the speed at which the iterated process is performed, whereas a shorter interval may be selected to increase the likelihood of delivering the largest rectangle circumscribed by the global boundary.

If the point can be grown into a minimum rectangle having the aspect ratio of the input image 300 ("YES" in step S405), then the point is grown into a minimum rectangle having the aspect ratio of the input image 300. For example, if the input image 300 has a 1:2 aspect ratio, then the corresponding minimum rectangle has a width of one pixel and a height of two pixels, i.e., the minimum rectangle is a 1 pixel by 2 pixels rectangle.

In step S406, directions aligned with the minimum are identified. The identified directions are directions in which the minimum rectangle can be grown from the selected point while still maintaining the aspect ratio of the input image 300. In the example embodiment, the directions are aligned with the diagonals the minimum rectangle, and the identified directions are diagonal directions in which the minimum rectangle can be grown from the selected point while still maintaining the aspect ratio of the input image 300.

The minimum rectangle is grown in a first direction from the selected point until it intersects with a boundary of the global boundary (step S407). In the example embodiment, the minimum rectangle grows at a predetermined interval. The predetermined interval can be selected based on a user input. A longer interval may be selected to increase the speed at which the iterated process is performed, whereas a shorter interval may be selected to increase the likelihood of delivering the largest rectangle circumscribed by the global boundary.

In step S408, a determination is made as to whether the grown rectangle can grow in another direction. If it is determined that the rectangle grown in step S407 can grow in another direction, then the grown rectangle is grown in the other direction (step S409).

In step S410, MA module 138 compares the grown rectangle with the largest rectangle encountered previously to determine whether the grown rectangle is larger than the largest rectangle encountered previously. If the grown rectangle is larger than the largest rectangle encountered previously ("YES" in step S410), then the coordinates of the grown rectangle are saved and identified as the coordinates for the largest encountered rectangle thus far (step S411).

In step S412, MA module 138 determines whether there are remaining directions in which the minimum rectangle can be grown from the selected point while still maintaining the aspect ratio of the input image 300. If there are remaining directions in which the minimum rectangle can be grown from the selected point ("YES" in step S412), then processing returns to step S407, and the minimum rectangle is grown in another direction. If there are no more remaining directions in which the minimum rectangle can be grown from the selected point ("NO" in step S412), then processing proceeds to step S413.

In step S413, MA module 138 determines whether the stopping condition has been met. In the example embodiment, the stopping condition is met when the entirety of the global boundary has been traversed.

If the stopping condition has not been met ("NO" in step S413), then processing returns to step S404 where a new point is selected at a location of the global boundary.

If the stopping condition has not been met ("YES" in step S413), then at step S414, the coordinates of the largest encountered rectangle are delivered to ID module 140.

The coordinates of the largest encountered rectangle within the global boundary are used by ID module 140 to display the sub-images provided by DSI module 137 within the largest rectangular area on the projection surface.

Furthermore, in this embodiment, DSI module 137 divides input image 300 in step S403 before MA module 138 determines the maximum area. However, the order of operation of DSI module 137 and MA module 138 is interchangeable, and alternatively can be performed in parallel.

Figure 5A:
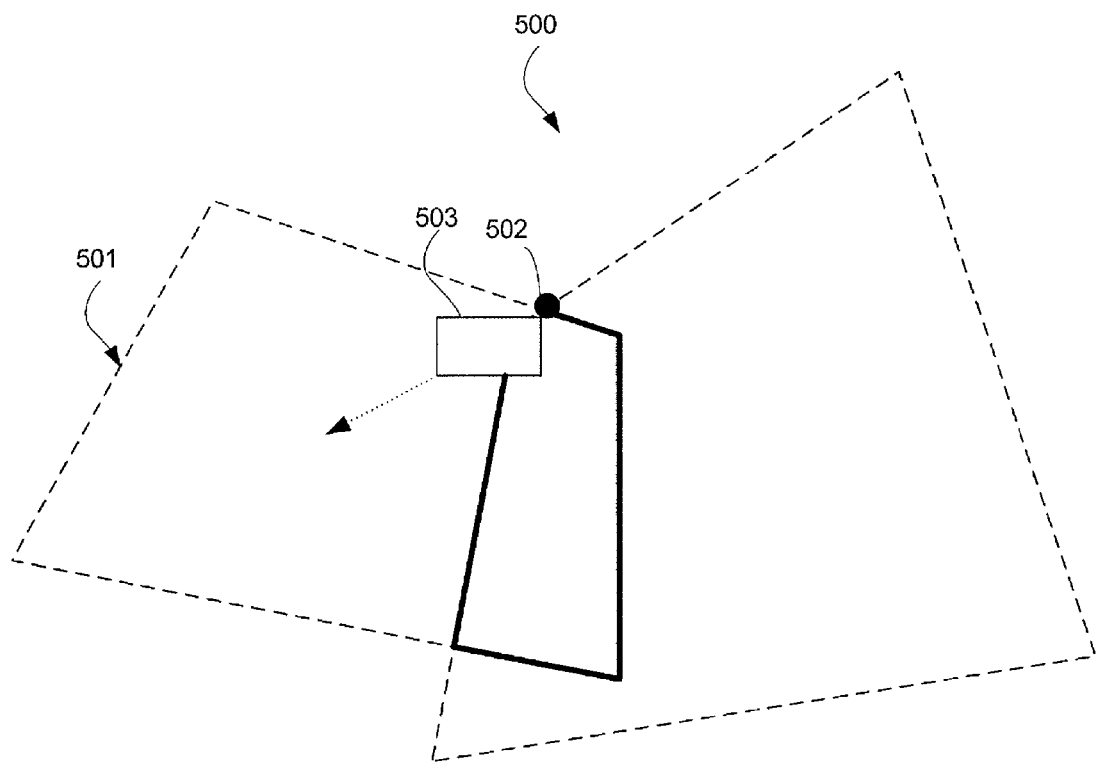
FIGS. 5A to 5F illustrate an iteration of the process for determination of a rectangular area.

FIGS. 5A to 5F illustrate an iteration of the process for determination of a rectangular area. FIG. 5A depicts a composite projection area 500 formed by the individual projection areas of two projectors. The composite projection area is circumscribed by a global boundary 501 that has a shape of a concave polygon. As shown in FIG. 5A, the global boundary is formed by distorted projections of rectangles by all of the multiple projectors in the projector array onto the projection surface. At the beginning of the iteration depicted in FIG. 5A, point 502 is selected on the global boundary 501, and the minimum rectangle 503 is positioned at the selected point 502. Two directions are identified in which the minimum rectangle 503 can grow from point S502. As shown in FIG. 5A, the top right corner of the minimum rectangle 503 is positioned at the point 502 to indicate growth in the first direction.

Figure 5B:
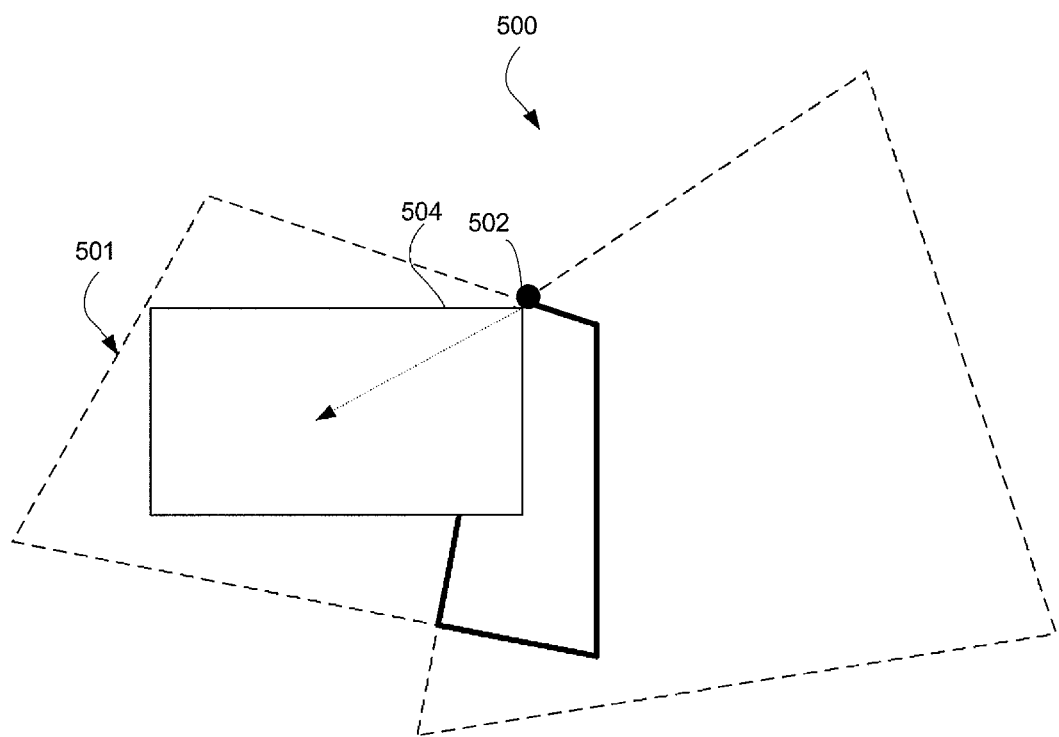

FIG. 5B depicts the rectangle grown from minimum rectangle 503 in the first direction. As shown if FIG. 5B, the grown rectangle 504 intersects with a boundary of the global boundary 501. As illustrated in FIG. 5B, the grown rectangle 504 can grow in a another direction.

Figure 5C:
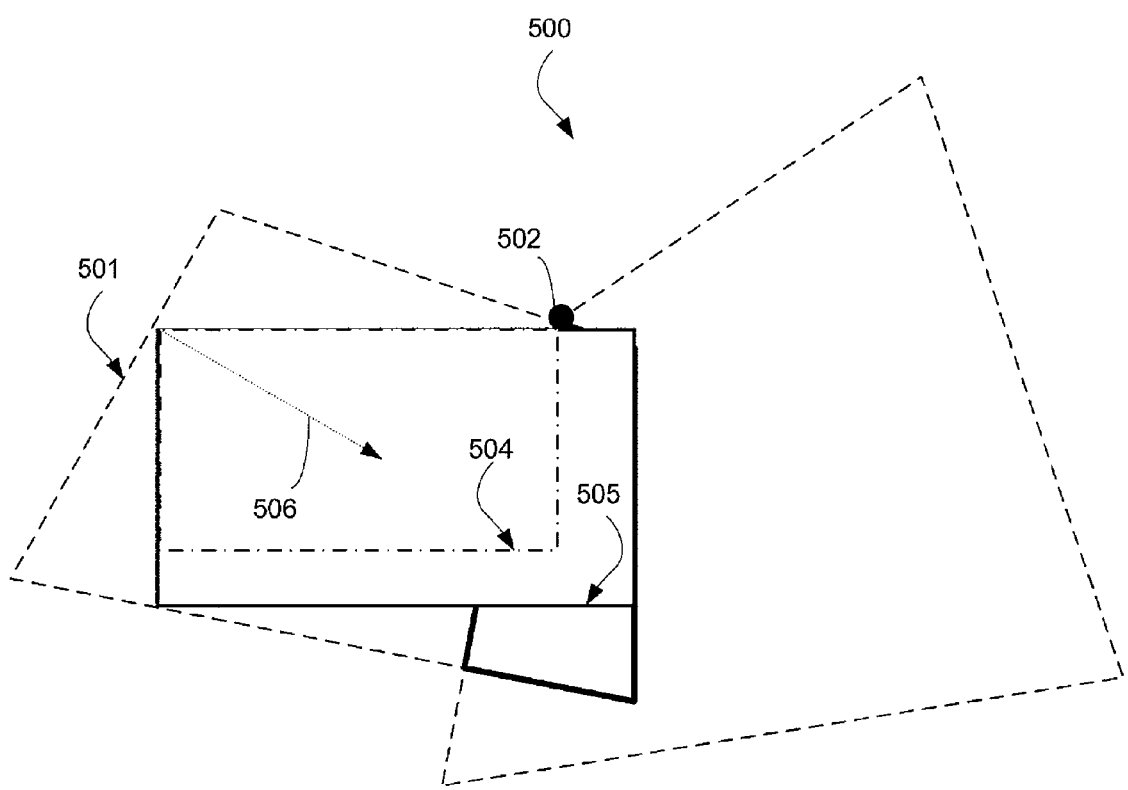

FIG. 5C depicts grown rectangle 505 which is grown from the rectangle 504 in the direction 506.

Figure 5D:
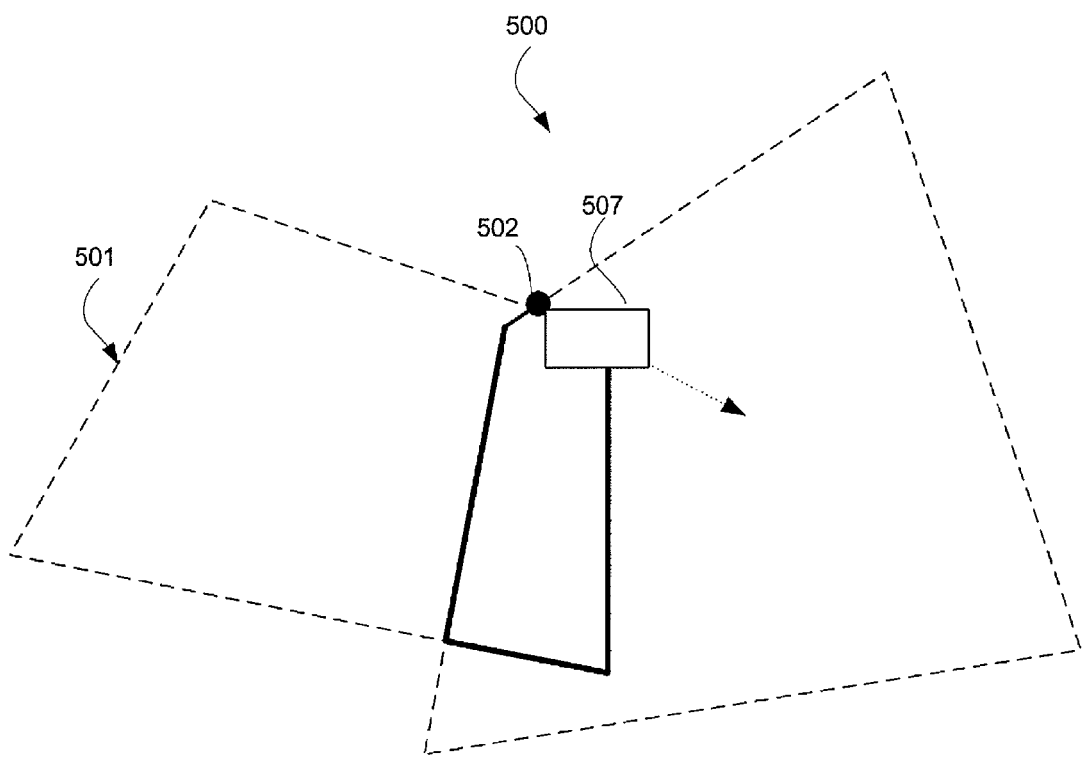

FIG. 5D depicts the positioning of the minimum rectangle prior to growth in the second direction. As shown in FIG. 5D, the top left corner of the minimum rectangle 507 is positioned at the point 502 to indicate growth in the second direction.

Figure 5E:
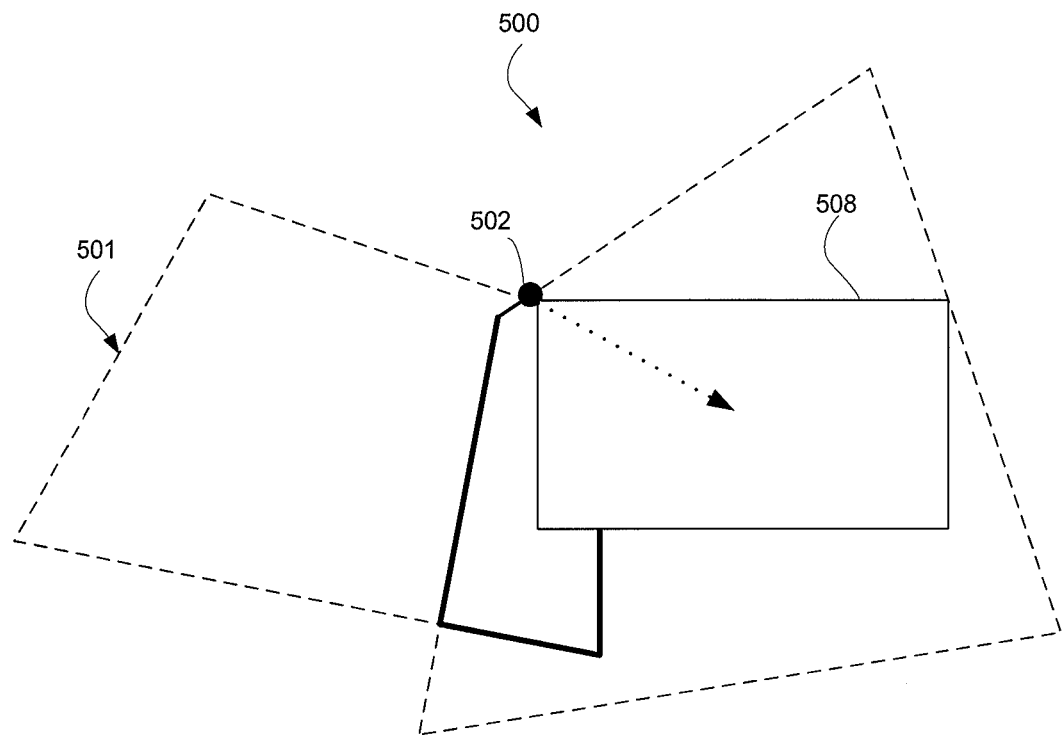

FIG. 5E depicts the rectangle grown from minimum rectangle 507 in the second direction. As shown if FIG. 5E, the grown rectangle 508 intersects with a boundary of the global boundary 501. As illustrated in FIG. 5E, the grown rectangle 508 can grow in a another direction.

Figure 5F:
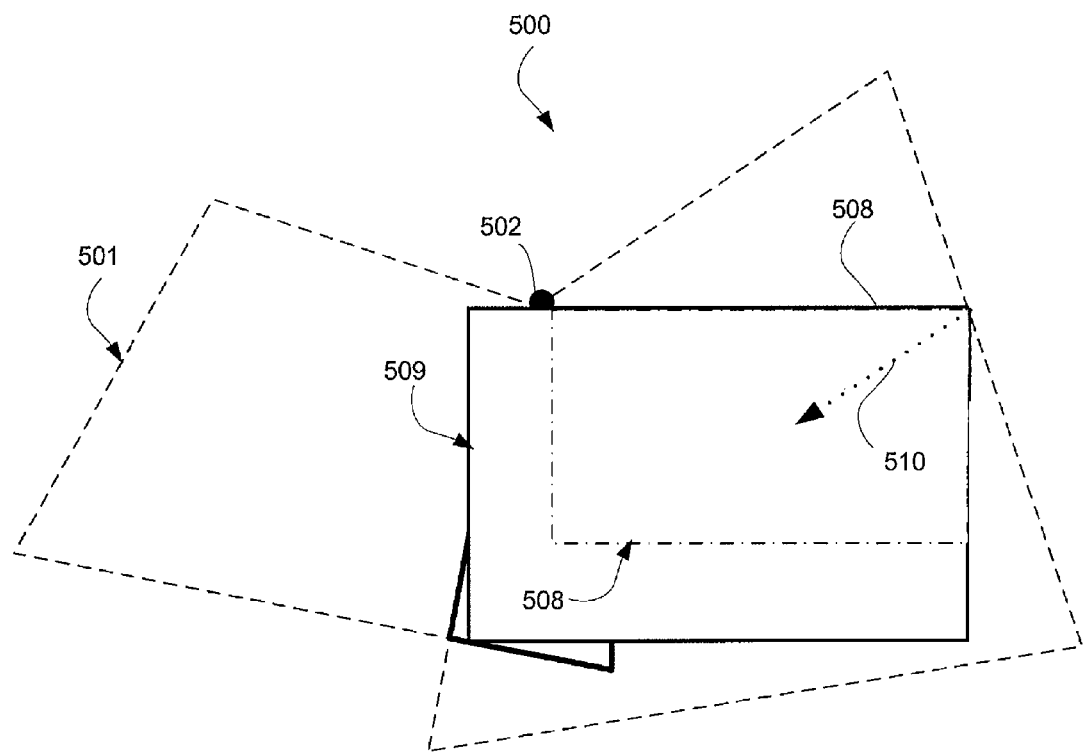

FIG. 5F depicts grown rectangle 509 which is grown from the rectangle 508 in the direction 510. Grown rectangle 509 is compared with grown rectangle 505 of FIG. 5C, and the larger of grown rectangle 509 and grown rectangle 505 is the largest rectangle encountered thus far. Subsequent iterations are performed by selecting another point along global boundary 501 until the entirety of the global boundary 501 has been traversed.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for determining a rectangular area with a given aspect ratio within a global boundary formed on a projection surface by multiple projectors, the method comprising:
   repeatedly performing an iterated process at moved locations along the global boundary until a stopping condition has been met,
   wherein the iterated process comprises:
   selecting a point at a location of the global boundary,
   identifying directions aligned with a minimum rectangle positioned at the selected point in which the minimum rectangle with the given aspect ratio can be grown from the selected point,
   wherein for each such direction:
   growing the minimum rectangle with the given aspect ratio in the direction from the selected point until it intersects with a boundary of the global boundary,
   determining whether the grown rectangle can grow in another direction responsive to the grown rectangle intersecting with the boundary of the global boundary,
   growing the grown rectangle in the other direction responsive to a determination that the grown rectangle can grow in the other direction,
   comparing the grown rectangle with a largest rectangular area encountered previously, and
   replacing the largest rectangle encountered previously responsive to a comparison which indicates that the grown rectangle is larger than the largest rectangle encountered previously,
   wherein the method further comprises:
   delivering the largest rectangle encountered responsive to a determination that the stopping condition has been met.

2. The method of claim 1, wherein the global boundary comprises a polygonal boundary formed by distorted projections of rectangles by all of the multiple projectors in a projector array onto the projection surface.

3. The method of claim 2, wherein the global boundary comprises a concave polygon.

4. The method of claim 1, wherein the moved location along the global boundary is a location moved by a predetermined interval.

5. The method of claim 1, wherein the minimum rectangle grows by a predetermined interval.

6. The method of claim 1, wherein the stopping condition comprises a determination that the entirety of the global boundary has been traversed.

7. A module for determining a rectangular area with a given aspect ratio within a global boundary formed on a projection surface by multiple projectors, the module comprising:
   a growing module constructed to repeatedly perform an iterated process at moved locations along the global boundary until a stopping condition has been met,
   wherein the iterated process comprises:
   selecting a point at a location of the global boundary,
   identifying directions aligned with a minimum rectangle positioned at the selected point in which the minimum rectangle with the given aspect ratio can be grown from the selected point,
   wherein for each such direction:
   growing the minimum rectangle with the given aspect ratio in the direction from the selected point until it intersects with a boundary of the global boundary,
   determining whether the grown rectangle can grow in another direction responsive to the grown rectangle intersecting with the boundary of the global boundary,
   growing the grown rectangle in the other direction responsive to a determination that the grown rectangle can grow in the other direction,
   comparing the grown rectangle with a largest rectangular area encountered previously, and
   replacing the largest rectangle encountered previously responsive to a comparison which indicates that the grown rectangle is larger than the largest rectangle encountered previously,
   wherein the module further comprises:
   a delivering module constructed to deliver the largest rectangle encountered responsive to a determination that the stopping condition has been met.

8. The module of claim 7, wherein the global boundary comprises a polygonal boundary formed by distorted projections of rectangles by all of the multiple projectors in a projector array onto the projection surface.

9. The module of claim 8, wherein the global boundary comprises a concave polygon.

10. The module of claim 7, wherein the moved location along the global boundary is a location moved by a predetermined interval.

11. The module of claim 7, wherein the minimum rectangle grows by a predetermined interval.

12. The module of claim 7, wherein the stopping condition comprises a determination that the entirety of the global boundary has been traversed.

13. An apparatus for determining a rectangular area with a given aspect ratio within a global boundary formed on a projection surface by multiple projectors, the apparatus comprising:
   a computer-readable memory constructed to store computer-executable process steps; and
   a processor constructed to execute the computer-executable process steps stored in the memory;
   wherein the process steps stored in the memory comprise computer-executable process steps to:
   repeatedly perform an iterated process at moved locations along the global boundary until a stopping condition has been met,
   wherein the iterated process comprises:
   selecting a point at a location of the global boundary,
   identifying directions aligned with a minimum rectangle positioned at the selected point in which the minimum rectangle with the given aspect ratio can be grown from the selected point,
   wherein for each such direction:
   growing the minimum rectangle with the given aspect ratio in the direction from the selected point until it intersects with a boundary of the global boundary,
   determining whether the grown rectangle can grow in another direction responsive to the grown rectangle intersecting with the boundary of the global boundary,
   growing the grown rectangle in the other direction responsive to a determination that the grown rectangle can grow in the other direction,
   comparing the grown rectangle with a largest rectangular area encountered previously, and
   replacing the largest rectangle encountered previously responsive to a comparison which indicates that the grown rectangle is larger than the largest rectangle encountered previously,
   wherein the process steps further comprise:
   delivering the largest rectangle encountered responsive to a determination that the stopping condition has been met.

14. The apparatus of claim 13, wherein the global boundary comprises a polygonal boundary formed by distorted projections of rectangles by all of the multiple projectors in a projector array onto the projection surface.

15. The apparatus of claim 14, wherein the global boundary comprises a concave polygon.

16. The apparatus of claim 14, wherein the moved location along the global boundary is a location moved by a predetermined interval.

17. The apparatus of claim 14, wherein the minimum rectangle grows by a predetermined interval.

18. The apparatus of claim 14, wherein the stopping condition comprises a determination that the entirety of the global boundary has been traversed.

19. A computer-readable storage medium on which is retrievably stored computer-executable process steps for determining a rectangular area with a given aspect ratio within a global boundary formed on a projection surface by multiple projectors, the process steps comprising:
   repeatedly performing an iterated process at moved locations along the global boundary until a stopping condition has been met,
   wherein the iterated process comprises:
   selecting a point at a location of the global boundary,
   identifying directions aligned with a minimum rectangle positioned at the selected point in which the minimum rectangle with the given aspect ratio can be grown from the selected point,
   wherein for each such direction:
   growing the minimum rectangle with the given aspect ratio in the direction from the selected point until it intersects with a boundary of the global boundary,
   determining whether the grown rectangle can grow in another direction responsive to the grown rectangle intersecting with the boundary of the global boundary,
   growing the grown rectangle in the other direction responsive to a determination that the grown rectangle can grow in the other direction, comparing the grown rectangle with a largest rectangular area encountered previously, and replacing the largest rectangle encountered previously responsive to a comparison which indicates that the grown rectangle is larger than the largest rectangle encountered previously, wherein the process steps further comprise:

delivering the largest rectangle encountered responsive to a determination that the stopping condition has been met.

20. The computer-readable storage medium of claim 19, wherein the global boundary comprises a polygonal boundary formed by distorted projections of rectangles by all of the multiple projectors in a projector array onto the projection surface.

21. The computer-readable storage medium of claim 20, wherein the global boundary comprises a concave polygon.

22. The computer-readable storage medium of claim 19, wherein the moved location along the global boundary is a location moved by a predetermined interval.

23. The computer-readable storage medium of claim 19, wherein the minimum rectangle grows by a predetermined interval.

24. The computer-readable storage medium of claim 19, wherein the stopping condition comprises a determination that the entirety of the global boundary has been traversed.

* * * * *